Nov. 24, 1970  C. BRICHARD  3,543,033
PHOTOELECTRIC DEFECT DETECTOR WHICH DETERMINE COORDINATE
OF DEFECT BY MAGNITUDE OF SCANNING VOLTAGE
AND CURRENT AT POSITION OF DEFECT
Filed Oct. 30, 1968  6 Sheets-Sheet 1

INVENTOR
CLAUDE BRICHARD
BY Edmund M. Jaskiewicz
ATTORNEY

Nov. 24, 1970 C. BRICHARD 3,543,033
PHOTOELECTRIC DEFECT DETECTOR WHICH DETERMINE COORDINATE
OF DEFECT BY MAGNITUDE OF SCANNING VOLTAGE
AND CURRENT AT POSITION OF DEFECT
Filed Oct. 30, 1968 6 Sheets-Sheet 3

Fig.4.

INVENTOR
CLAUDE BRICHARD

BY Edmund M. Jaskiewicz
ATTORNEY

Nov. 24, 1970   C. BRICHARD   3,543,033
PHOTOELECTRIC DEFECT DETECTOR WHICH DETERMINE COORDINATE
OF DEFECT BY MAGNITUDE OF SCANNING VOLTAGE
AND CURRENT AT POSITION OF DEFECT
Filed Oct. 30, 1968   6 Sheets-Sheet 4

INVENTOR
CLAUDE BRICHARD

BY Edmund M. Jaskiewicz
ATTORNEY

Nov. 24, 1970          C. BRICHARD          3,543,033
PHOTOELECTRIC DEFECT DETECTOR WHICH DETERMINE COORDINATE
OF DEFECT BY MAGNITUDE OF SCANNING VOLTAGE
AND CURRENT AT POSITION OF DEFECT
Filed Oct. 30, 1968                         6 Sheets-Sheet 5

INVENTOR
CLAUDE BRICHARD

BY Edmund M. Jaskiewicz
ATTORNEY

Nov. 24, 1970 C. BRICHARD 3,543,033
PHOTOELECTRIC DEFECT DETECTOR WHICH DETERMINE COORDINATE
OF DEFECT BY MAGNITUDE OF SCANNING VOLTAGE
AND CURRENT AT POSITION OF DEFECT
Filed Oct. 30, 1968 6 Sheets-Sheet 6

Fig.9.

INVENTOR
CLAUDE BRICHARD

BY Edmund M. Jaskiewicz
ATTORNEY

United States Patent Office 3,543,033
Patented Nov. 24, 1970

3,543,033
PHOTOELECTRIC DEFECT DETECTOR WHICH DETERMINE COORDINATE OF DEFECT BY MAGNITUDE OF SCANNING VOLTAGE AND CURRENT AT POSITION OF DEFECT
Claude Brichard, 11 Rue Dewiest, Jumet, Belgium
Filed Oct. 30, 1968, Ser. No. 771,862
Claims priority, application Netherlands, Oct. 31, 1967, 54,776
Int. Cl. G01n 21/16
U.S. Cl. 250—219                           43 Claims

ABSTRACT OF THE DISCLOSURE

There is disclosed a process and an apparatus for determining at least one of the coordinates of a defect in sheet material of determinate or indeterminate length. A luminous beam or electronic beam is scanned across successive bands of the sheet material. The displacement of the scanning beam along each band is controlled directly or indirectly by an electrical factor such as voltage or current whose magnitude varies in the same direction during each scan. As the beam encounters a defect during its scan the magnitude of the electrical factor will deviate in response to this defect. The measurement of this deviation of magnitude will indicate a coordinate of the defect.

---

The present invention relates to the manufacturing and treatment of sheet material, more particularly, to a process and apparatus for determining at least one of the coordinates of defects in sheet material moving past a scanning station.

In different industries the final product is fabricated from sheet material in the form of a continuous strip after one or more successive treatment operations. Such industries may include metals where plates are fabricated, the glass and mirror industry and the plastics and paper industries. This strip material is subsequently cut into pieces of various sizes in accordance with predetermined requirements. The pieces may be cut directly from the end of the strip as it continuously advances. As an alternative, the continuous strip may be cut into sheets of uniform size by cuts perpendicular to the direction of movement of the strip. The cut sheets are then further cut into the different sizes as may be specified in an order book.

In order to obtain pieces of a designated quality from whichever cutting procedure is followed, it is necessary to know the location of any defects in the material. Where the speed of the strip material is not too high defects can be located visually by an inspector and then marked, such as with chalk, so that the presence of such defects can be taken into consideration during the cutting operations. However, this visual detection and marking of defects is not feasible where the material moves at high speeds during the manufacturing process. Further, the increasingly high standards of quality required for many products cannot be attained by such visual detection and marking.

Several industries have adopted automatic cutting operations of sheet or strip material based on optimum cutting schedules as determined by data processing machines. The increasing use of automation requires that the cutting operations keep pace with the speed of conveying the product during manufacture. In order to establish such cutting schedules, the defects in the material must be quickly located and information locating these defects immediately fed to the data processing machines.

It is therefore the principal object of the present invention to provide a process and apparatus for quickly and accurately locating defects in sheet material.

It is another object of the present invention to provide a process and apparatus for quickly obtaining information relating to the coordinates of defects in sheet material without visual inspection and marking of the material.

According to the present invention there is disclosed a process for determining at least one of the coordinates of a defect in sheet material. The process may comprise generating a luminous or electron beam within an automatic defect detection system. The beam is scanned along successive bands of the sheet material which may but not extend over the full dimension of the material in one direction. Where the material is in strip form the strip may be scanned along successive transverse bands extending across the full width of the strip. Where the material has been cut into rectangular sheets, each sheet can be scanned along bands running parallel with either pair of opposed edges of the sheet and each band may extend across or along the entire sheet or only a portion therof. The sheet material may be transported past a scanning station, however, the scanning beam may scan successive bands while the material is stationary. Where the material is moving it is scanned along bands which are transverse to the direction of movement of the sheet or strip material.

The displacing of the scanning beam along each band is controlled by an electrical factor, such as voltage or current. The magnitude of the electrical factor varies in monotone fashion so that the change in magnitude is always an increase or a decrease during each scan. Preferably, the change in magnitude is of the same sign, or in the same direction, during the scanning of successive bands with the beam being returned after each scanning to a predetermined starting point so that the magnitude of the electrical factor is at the same value at the beginning of each scanning. The automatic detection system may be so constructed that when a defect is encountered by the beam a signal is generated indicative of the magnitude of the electrical factor at that time that the effect is encountered. This signal will thus be indicative of the distance between the defect and the position in which the beam began scanning of that particular band. This distance will therefore indicate one coordinate of the defect. Thus, given the magnitude of the electrical factor at the time the beam encounters a defect and the deviation of this electrical factor at that time the magnitude of the factor will be a measure of the location of the beam as it impinged upon the defect along that band.

An apparatus in accordance with the present invention may comprise a scanning beam generator. There is also provided means in the form of a sawtooth voltage or current generator for generating the electrical factor which varies periodically and in the same direction during each period. In order to assure that the point of impact of the scanning beam moves at a constant speed over the surface of the sheet material a voltage or current generator feeds a generator having a function (A arc tan B.t) whose output in turn is transmitted to the scanning beam generator. There is a detector which delivers at least one signal in response to the scanning beam detecting either a defect or a reference with respect to the sheet material. A measuring circuit is connected to the means for generating the control electrical factor and delivers a signal in response to the detection signal and indicative of the value of the electrical factor at the instant of the detection signal.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
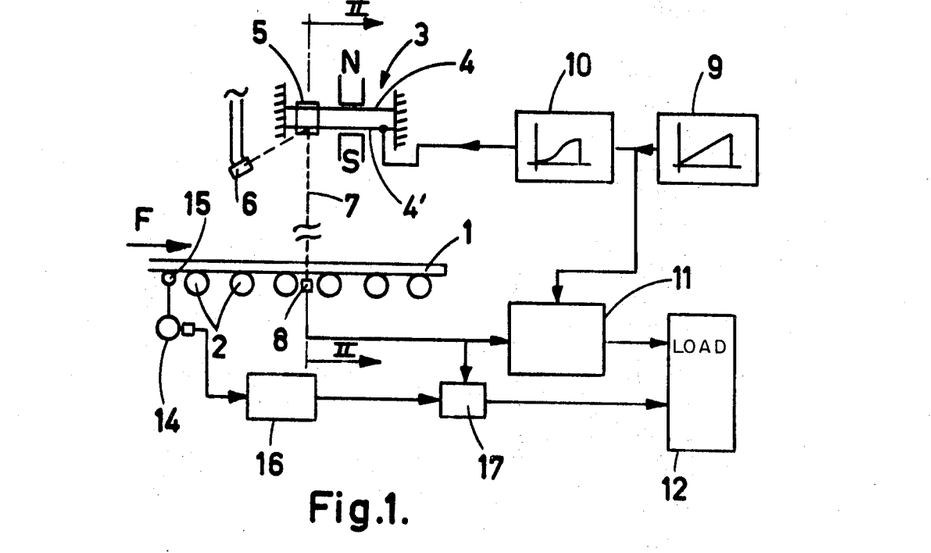
FIG. 1 is a schematic representation of the apparatus according to the present invention.
Figure 2:
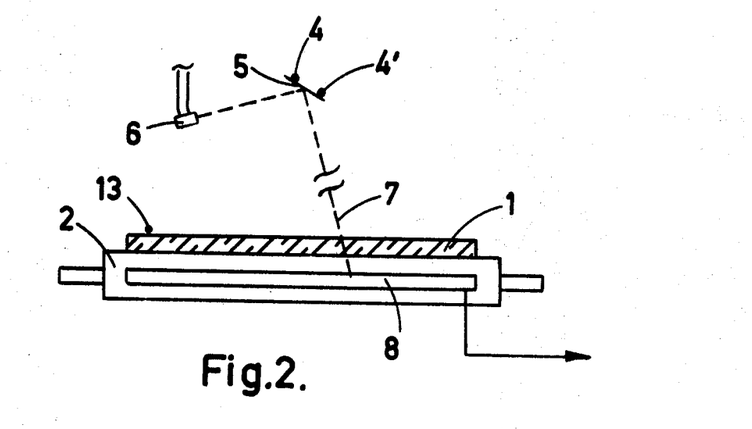
FIG. 2 is a sectional view taken along the line II—II of FIG. 1.

In FIGS. 1 and 2 there is shown an apparatus for the determination of the coordinates of defects in a transparent material, such as glass, in the form of a continuous strip. The strip of glass 1 which is to be inspected is moved in the direction indicated by the arrow F by means of conveyor rollers indicated at 2. The glass strip passes beneath a scanning beam generator indicated generally at 3. The generator comprises a mirror galvanometer having two stretched wires 4 and 4' upon which is mounted a small mirror 5. A control voltage is applied to the stretched wires which are positioned in the air gap of a permanent magnet whose north and south poles are indicated at N and S respectively.

A light source 6 emits a thin luminous beam which is redected at 7 by the mirror 5 toward the glass strip 1. Light source 6 has been illustrated in FIG. 1 outside of the position in which it is generally positioned in order to clarify the drawing. The scanning beam generator 3 is so mounted that under the action of the control voltage the reflected beam 7 will scan strip 1 transversely to its direction of movement.

Underneath glass strip 1 along the scanning line of beam 7 there is mounted a photo-electric cell 8 which is responsive to variations in the intensity of the beam transmitted through the strip. The variations in intensity result from the presence of defects. The photoelectric cell may also be positioned above strip 1 so as to detect any variations in the intensity of the beam reflected by the strip. This structure is suitable for detecting of defects in opaque materials.

The scanning movement of the strip 1 by the beam 7 is achieved through a sawtooth generator 9 whose output is supplied to a generator 10 the output of which is connected to the loop formed by the wires 4 and 4' of the mirror galvanometer. The output voltage of generator 10 is of the function (A. arc tan B.$t$) where A and B are constants and $t$=time which is variable. The function generator may comprise operational amplifiers and threshold circuits connected together in a manner as known for analogue computers.

The wire galvanometer disclosed herein enables relatively high scanning frequencies to be attained but through reduced scanning angles. When a high scanning speed is not required the wire galvanometer may be replaced by a moving coil galvanometer which has a greater scanning angle.

The photo-electric cell 8 underneath glass strip 1 has its output connected to a circuit indicated at 11 which also receives the output voltage of the sawtooth generator 9. One form of electrical circuit for the circuit 11 will be described with respect to the circuit of FIG. 3. The output of circuit 11 is supplied to a load circuit 12 which may comprise a data processing machine.

In operation, the output voltage from generator 10 will control the scanning by beam 7 so that the impact point of the beam on strip 1 is displaced across the strip at a constant speed. As the beam impinges upon a defect, there will be a variation in the intensity of the beam transmitted through the glass strip to produce a pulse on the output of the photoelectric cell 8. The pulse is supplied to circuit 11 which transmits to the load circuit 12 the height attained by the sawtooth voltage of the generator 9 at the instant that the pulse was delivered. The height of this voltage is indicative of the transverse coordinate of the defect with respect to the point of impact of the beam on the strip 1 and when the sawtooth voltage is at its minimum. In actual practice the transverse coordinate with respect to the point at which the sawtooth voltage is at a minimum is not of particular importance. Of greater value is the relationship of this transverse coordinate with respect to a reference line upon the strip. In the case of a continuous glass strip the reference line may be the boundary of the effective width of the strip. It is well known that this boundary does not coincide with the actual edge of the strip.

In order to define a boundary at the effective width a horizontal rod 13 is mounted above the glass strip by a structure which is not illustrated in the drawings. The position of the rod 13 may be varied each time that the effective width of the strip is modified so that this rod coincides with the boundary of the effective width of the strip.

When the beam 7 scans the rod 13 the cell 8 will deliver a pulse to circuit 11. This circuit will determine the height of the sawtooth voltage at the instant the pulse was delivered. This value is transmitted to the load circuit 12 which will determine the difference between the heights of the voltage as measured for the defect and as measured for the reference. In this manner, the transverse coordinates will be measured from the boundary of the effective width of the strip.

As a result of the rapid drop of the voltage delivered by the generator 10 at the end of the scan, the beam 7 will be returned to its starting point so as to scan a line or band of the glass strip 1 adjacent to the band which has just been scanned. The movement of the beam from one band to the next results from the advance of the strip 1. It is therefore apparent that the frequency of the scanning must be related to the speed at which the strip moves if it is desired to inspect the entire surface of the strip. This frequency may be readily determnied either by calculation or by trial based upon the narrow band of material upon which the beam impinges during its scanning.

In order that complete information regarding the location of the defect be supplied to the load circuit 12 the coordinate of the defect in the longitudinal direction of the strip 1 should also be determined. For this purpose there is provided a pulse generator 14 which may comprise a phonic wheel controlled by the movement of the strip by means of a roller 15 rotating in contact with the strip. The pulses delivered by generator 14 are counted on a counter 16. A value as determined by counter 16 is transmitted to the load circuit 12 by a gate circuit 17 each time cell 8 delivers a pulse. The data as recorded on load circuit 12 with respect to the rectangular coordinates of the defects may then be employed for determining where the optimum cuts in the strip may be made.

Figure 3:
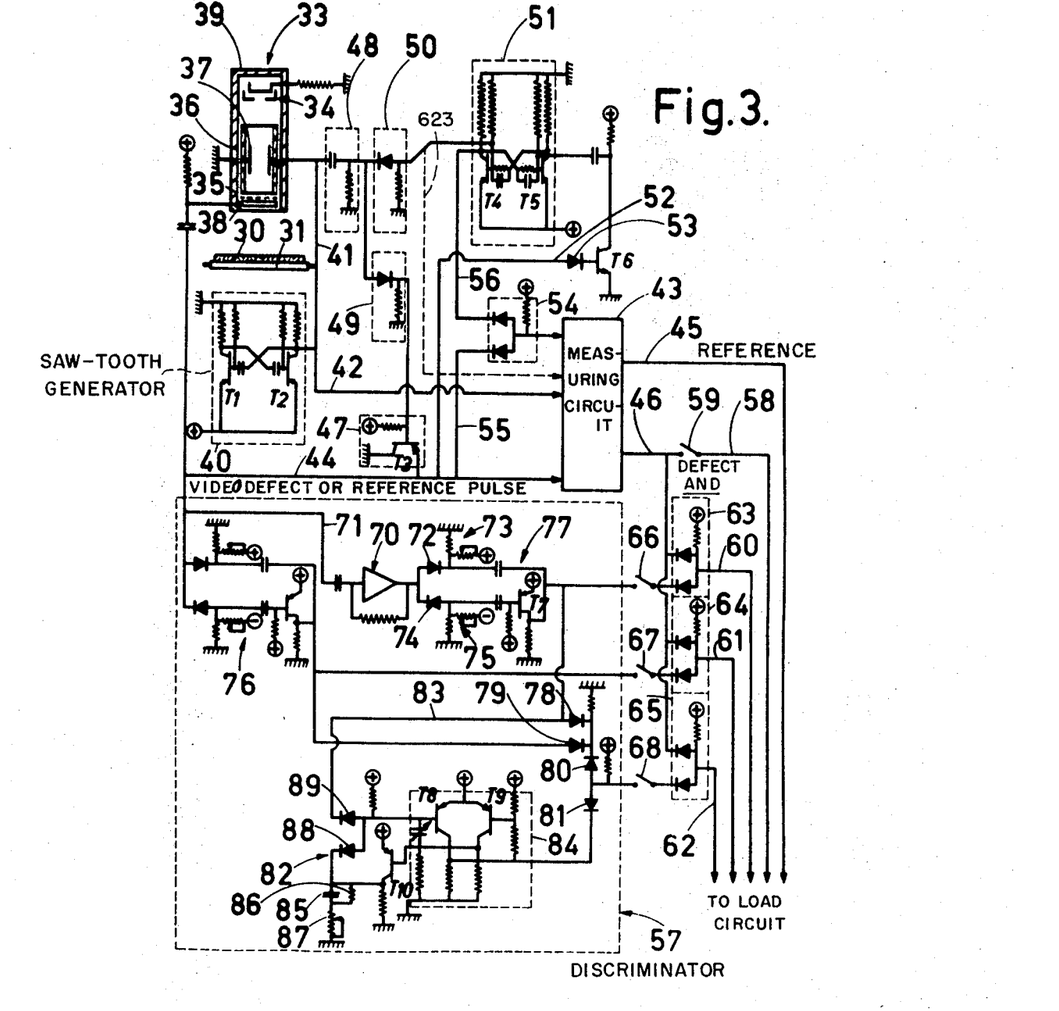
FIG. 3 is an electrical circuit diagram showing schematically another form of apparatus according to the present invention.

Proceeding next to FIG. 3 there is shown in detail an electrical circuit for the determination of the transverse coordinatee of defects in glass sheets by means of an electronic scanning device. The circuit may also be used for the circuit 11 of FIG. 1. A plurality of glass sheets, one being indicated at 30 are successively conveyed by a roller conveyor 31 underneath a scanning post which may comprise an electronic exposure tube 33 of a known type such as, for example, an orthicon, a vidicon with electrostatic or magnetic scanning. The exposure tube 13 comprises an electron gun 34, a photoconductive target 35 having a mosaic surface, a cylindrical concentration anode 36 and a pair of electrostatic deflecting plates 37. Opposite target 35 there is mounted a transparent electrode 38 upon which appears the video signal. These elements are enclosed in a housing 39 the interior of which is at a vacuum.

As the glass sheet 30 moves below tube 33 an image of the sheet is formed on the target 35. The target is scanned by the electronic beam emitted from gun 34 and is suitably deflected by the deflecting plates 37 to cause a signal to appear on the electrode 38. The deflecting plates 37 function to produce a straight line scanning on the target 35 with this line being positioned transversely with respect to the direction of movement of the glass.

In order to facilitate the detection of defects of the sheets on the target 35 the sheets may be illuminated from below by means of a plane luminous beam the plane of which includes the line of the target which is scanned. The structure for producing such a beam is not shown in the drawing.

In order to provide a reference from which the transverse coordinates are measured as disclosed in FIG. 1, there may be provided in FIG. 3 a small luminous beam which is parallel to the direction of advance of the sheets and which is adjacent the edges of the sheets. This apparatus is not shown in the drawings.

The scanning voltage is supplied to plates 37 through connection 41 from a sawtooth voltage generator 40 comprising transistors $T_1$ and $T_2$. The sawtooth voltage is also supplied by connection 42 to a measuring circuit 43 which will be subsequently describesd in greater detail.

The video signal from electrode 38 of the exposure tube 33 is supplied through connection 44 to the measuring circuit 43 to allow the determination of the height of the sawtooth by the circuit 43 at the instant that a defect is detected. The detection of a defect or the reference will appear in the form of a pulse on connection 44.

The measuring circuit 43 comprises an output line 45 upon which appears the measurement relating to the reference and a second output line 46 on which appears measurements relating to the defects. In operation, any pulse delivered on the connection 44 will cause measuring circuit 43 to determine the height of the sawtooth voltage at the instant of the pulse. This information will then be transmitted either on line 45 when the pulse derives from a reference or on the line 46 when the pulse comes from a defect.

To avoid the transmission of information on either of the lines 45 and 46 during the return of the electronic scanning beam to its starting position, it is necessary to prevent any video pulses from the electrode 38 from arriving at measuring circuit 43. This is accomplished by a gate circuit 47 connected to line 44 and comprising a transistor $T_3$ which short circuits to ground any video pulses during the return of the scanning beam. The transistor $T_3$ is controlled by the sawtooth voltage of generator 40 being supplied through line 41 to a capacitive derivative circuit 48. The output of the derivative circuit 48 is supplied to the base of transistor $T_3$ through a positive pulse selecting circuit 49.

As the sawtooth voltage increases during a scanning, the derivative circuit 48 will deliver a positive pulse which blocks transistor $T_3$. The video pulses are then transmitted to the measuring circuit 43. However, during the rapid decrease of the sawtooth voltage at the end of the scanning and when the scanning beam is being returned to its starting point, the derivative circuit 48 will deliver a negative pulse which is blocked by the diode of the circuit 49. The transistor $T_3$ is then rendered conductive and short circuits the video pulses to ground.

To enable measuring circuit 43 to shunt reference or defect measurements to the respective output lines 45 and 46, a signal is supplied to the measuring circuit 43 which permits identification of a video pulse in line 44 arising from scanning of the reference. It is pointed out that the video pulse from the reference will be the first pulse in line 44 after the sawtooth voltage of generator 40 has returned to its initial value. It is assumed that the reference is a flat luminous beam parallel to the direction of movement of the strip and in close proximity to the edge of the strip from which the scanning of the strip is initiated. When the reference is in this position the reference will be scanned before any defect on the strip.

The signal which will permit the identification of a reference pulse in line 44 is supplied from a circuit comprising a negative pulse selecting circuit 50 having a diode whose input is connected to the output of the derivative circuit 48. The output of the selecting circuit 50 is connected to the base of a transistor $T_4$ in a bistable flip-flop 51 comprising transistors $T_4$ and $T_5$. The base of the transistor $T_5$ is controlled by video pulses from line 44 across line 52, a diode 53 and a pulse polarity reverse transistor $T_6$. Only positive pulses will flow through diode 53 toward the base of the transistor $T_6$. The output of flip-flop 51 is supplied to the collector of the transistor $T_4$ and is applied by line 56 to the first input of an AND gate circuit 54 having two inputs. The second input receives the video pulse from line 44 through the connection 55. The output of the AND gate 54 will be the identifying or preference signal which is applied to the measuring circuit 43.

In order to facilitate the comprehension of the present invention the operation of that portion of the circuit which has been disclosed above will next be described.

When the sawtooth voltage supplied by generator 40 attains its maximum at a point when the scan of the strip is completed, the voltage will drop abruptly. The derivative circuit 48 will then deliver a negative pulse through the polarity selecting circuit 50 to the base of transistor $T_4$. This transistor, which is normally non-conductive, is rendered conductive and thus blocks transistor $T_5$. A positive signal will then be supplied through line 56 at the first input of the AND gate 54.

As the sawtooth voltage begins to increase at the beginning of the next scan, the scanning beam will impinge upon the image of the reference and a positive video pulse will be generated in line 44. This pulse will be transmitted to the measuring circuit 43 where the height of the sawtooth voltage at this instant will be determined, and the pulse will also be delivered through connection 55 to the second output of the AND gate 54. This will cause the appearance of a positive voltage on the output of the AND circuit 54 and this voltage will be the reference signal.

At the instant that the video pulse is applied to the AND circuit 54 it is also applied through line 52 to the base of transistor $T_6$ which through its collector applies a negative pulse to the base of transistor $T_5$ of the flip-flop 51. As a result of this pulse flip-flop 51 will be returned to its initial state in which transistor $T_4$ is blocked and transistor $T_5$ is conductive.

Any subsequent pulse which appears in line 44 will thus necessarily derive from a defect and will not produce any signal at the output of the AND circuit 54 since one of the inputs of this AND circuit is blocked because of the state of the flip-flop 51.

The circuit shown in FIG. 3 also comprises a discriminator circuit indicated generally at 57. This circuit enables information pertaining to defects which appears on line 46 as an output of the measuring circuit 43 to be shunted into different lines as a function of the nature of the defect. For this purpose there is provided a line 58 having a switch 59 which can be connected directly to line 46. Thus, information relating to all defects will appear on line 58 when switch 59 is closed.

Three additional lines 60, 61 and 62 are provided for transmitting information relating to defects which respectively have a derivative which exceeds a predetermined threshold, presents a specified level, and exceeds a specified length or duration. The lines 60, 61, and 62 are respectively connected to the output of AND gates 63, 64, and 65 with each circuit having two inputs. The first inputs of circuits 63, 64, and 65 are connected directly to the defect line 46 while the second inputs are each connected through respective selector switches 66, 67, and 68 to the discriminator 57.

In order to determine those defects which result in a video signal whose derivative exceeds a specified threshold, the discriminator 57 comprises an operational amplifier differentiator 70 having an input line 71 for receiving the video signal from the electrode 38. The output of the differentiator 70 is supplied to a circuit 77 having two thresholds connected in parallel with one threshold being provided for each polarity of the pulses delivered by differentiator 70. The threshold for the positive pulses comprises a diode 72 and a potentiometer 73. The threshold for the negative pulses comprises a diode 74, a potentiometer 75 and a polarity reversed transistor $T_7$. The outputs of these two thresholds are connected to a terminal of the selector switch 66.

A two-threshold circuit 76 similar to that described above is employed for the discrimination of defects which result in pulses presenting a specified level. The input of the threshold circuit 76 receives the video signal directly from the electrode 38 and its output is connected to a terminal of the selector switch 67.

In order to determine defects which exceed a predetermined length in the transverse direction with respect to the sheet being inspected, the discriminator circuit takes into consideration that in glass a relatively long defect could result in several pulses of different polarities. If the criterion of the length of a defect is based solely on the duration of the pulse, these different pulses might be interpreted as coming from several different defects which would not be the case. To overcome this difficulty, it is pointed out that when a pulse of a given polarity terminates and passes into a pulse of reversed polarity resulting from the same defect, the derivative will be high during the changeover from one pulse to the other and that this same derivative will cancel out at the end of a pulse which corresponds to the end of the defect.

The portion of the discriminator circuit pertaining to defect length comprises an OR gate having diodes 78 and 79 to which are supplied the output voltages of threshold circuits 77 and 76. The output of the OR gate is supplied to one of the inputs of an AND gate comprising diodes 80 and 81. The other input of this AND gate is fed from a delay circuit 82 which is initiated by the output of threshold circuit 77. The output of the AND gate is connected to one of the terminals of the selector switch 68.

In operation, the sensing by the beam of a defect of considerable length will result in a succession of pulses, generally of different polarities. Therefore, during the entire duration of the defect, a signal will appear on the output of the AND circuit (78, 79), either because the pulse is of a sufficient level or because the derivative of the pulse presents a sufficient value, as has been described above. From the beginning of the detection of the defect the threshold circuit 77 which is subsequent to the differentiator 70 produces a pulse which is transmitted through line 83 to start the delay circuit 82. The delay circuit will block the input 81 of the AND gate for a specified period of time. When this period of time has elapsed, a signal will be supplied to input 81 and the AND gate (80, 81), will supply a signal to its output as long as an output signal still exists on the OR circuit (78, 79).

The delay circuit 82 comprises a monostable multi-vibrator 84 having a transistor $T_8$ which is normally conductive and a transistor $T_9$ which is consequently non-conductive. The collector of transistor $T_8$ is connected to the diode 81 of the AND gate (80, 81). The collector of the transistor $T_9$ is connected to the base of a polarity reverser transistor $T_{10}$ whose collector is connected through a delay circuit comprising capacitor 85 and two resistors 86 and 87 to a diode 88 of an AND gate consisting of diodes 88 and 89. The output of the threshold circuit 77 is supplied through line 83 to the diode 89.

When delay circuit 82 is in the resting condition, transistor $T_9$ is non-conductive and transistor $T_{10}$ is conductive, thereby assuring the charging of the capacitor 85 and consequently the application of a signal to the diode 88 of the AND gate.

When a pulse is delivered from the threshold circuit 77, it is supplied through line 83 to the diode 89 of the AND gate. The gate then delivers a pulse to the flip-flop 84 because of the presence of a signal on the diode 88. The change of the monostable flip-flop 84 into the state where the transistor $T_8$ is blocked and the transistor $T_9$ is conductive results, on one hand, the blocking of the transistor $T_{10}$. The suppression of the signal at the diode 81 will block the output of the AND gate (80, 81) until that instant when the flip-flop returns to its state of rest. As transistor $T_{10}$ is blocked, capacitor 85 will be rapidly discharged through resistor 86 which will suppress any signal on the diode 88 of the AND gate (88, 89). Thus, any pulse originating from the threshold circuit 77 and going toward the flip-flop 84 will be blocked.

When the flip-flop 84 returns to its initial state, a positive signal again will be transmitted to the diode 81. If at this time there should be a signal from one of the threshold circuits 76, 77 still existing at the diode 80, this signal will be transmitted to the AND circuit 65 for the purpose of assuring the transfer of information from the measuring circuit 43 to line 62. This return of the flip-flop to its initial state will also render transistor $T_{10}$ conductive. As a result, capacitor 85 will be slowly charged across the resistor 87. A positive signal will therefore appear at the diode 88 only after an interval of time depending on the values of the capacitor 85 and the resistor 87. Consequently, after the flip-flop 84 returns to its state of rest, AND gate 88, 89 will remain blocked for a predetermined time. This blocking will prevent the restarting of delay circuit 82 through any pulse from the threshold circuit 77 which may result from the same defect.

For the most convenient and effective operation of AND circuits 63, 64, and 65 each of the outputs of the discriminator circuit 57 should be provided with a circuit for synchronizing with the read out operations of the measuring circuit 43 when a digital type voltmeter or ammeter is used. As illustrated in FIG. 3, the output of measuring circuit 43 is in series. When the output of the measuring circuit is to be done in parallel, each AND circuit 63, 64, and 65 should be provided with as many AND circuits as there are digits to be transferred in parallel. It is apparent that it is possible to provide the discriminator circuit 57 with only some of the various circuits which have been mentioned. In the circuit of FIG. 3, the various elements required for the regeneration and synchronization of the pulses in the various portions of the circuit have been omitted for purposes of clarity. The use of these various elements in the circuit is well known in the art.

Figure 4:
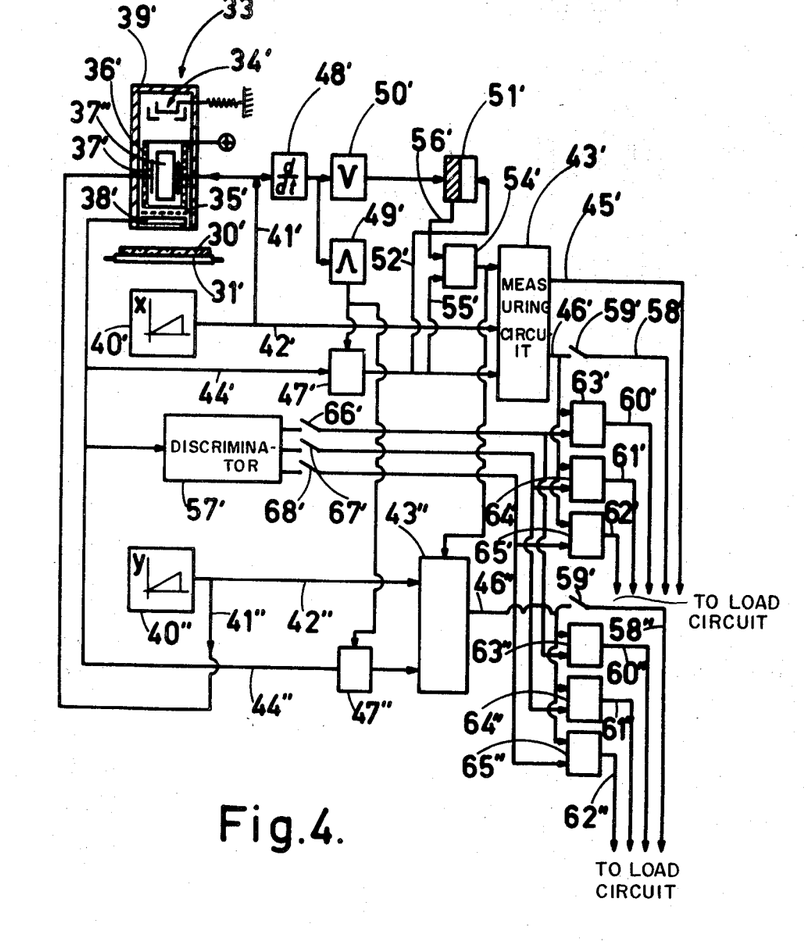
FIG. 4 is a block diagram showing schematically still another form of apparatus according to the present invention which applies the scanning along a raster.

In order to determine the coordinates in the direction of movement of the strip a circuit may be used which is similar to that described in FIG. 1. When the material being inspected is being advanced at a relatively high speed so that the utilization of an exposure tube for single line scanning no longer provides an inspection which covers the surface of the material, it may be advantageous to use an electronic exposure tube with raster scanning. In FIG. 4 there is illustrated a circuit which is suitable for such raster scanning.

Exposure tube 33' is provided with two pairs of deflecting plates 37' and 37". Plates 37' are for transverse coordinates which here shall be designated as X and plates 37" for the longitudinal coordinates which are designated as Y.

For the determination of the coordinates along the X-axis a sawtooth generator 40' supplies a voltage to the plates 37' and to the measuring circuit 43'.

Video pulses appearing on the electrode 38' are supplied to the measuring circuit 43' through line 44'. A gate circuit 47' is provided on line 44' to block video pulses during the return movement of the scanning beam. Gate circuit 47' is controlled by the derivative circuit 48' and the positive pulse selector circuit 49'. The reference signal is generated by the negative pulse selector circuit 50', the bistable flip-flop 51' and the AND circuit 54'. The operation of these elements is similar to the corresponding elements disclosed in FIG. 3. The discriminator 57' and the AND gates 63', 64', and 65' on the defect output line 46' of the measuring circuit 43' also operate in the same manner. Measuring circuit 43' has a second output line 45' which transmits information pertaining to the reference. Switches 59', 66', 67', and 68' carry out the same selective functions as disclosed by the corresponding switches in FIG. 3.

In order to determine the coordinates along the Y-axis a sawtooth voltage generator 40" is provided whose frequency is less than that of the generator 40'. The output voltage of the generator 40" passes through line 41" to the deflecting plates 37" and through the line 42" to measuring circuit 43". The video signal which is indicated on the electrode 38' is transmitted to the measuring circuit 43" through line 44". The line 44" is also provided with a gate circuit 47" which is controlled by the output of the positive pulse selecting circuit 49'.

Measuring circuit 43" is also supplied with the reference signal through the AND circuit 54' in order to block information on the output 46" when the electronic scanning beam impinges on the reference image. This is necessary since the reference coordinate in the longitudinal direction will have no significance. For the same reason measuring circuit 43" is provided with only a single output line 46" on which will appear all of the information relating to the coordinates along the Y-axis of defects. This information or data may be transmitted selectively on the lines 43", 60", 61", and 62" under the control of the switch 59' or the AND circuits 63", 64", and 65" which are controlled by the discriminator 57' and the switches 66', 67', and 68'.

Lines 58", 60", 61", and 62" will transmit data relating to the coordinates along the Y-axis of defects with respect to a reference associated with the exposure tubs 33'. In order to determine the Y coordinate with respect to one of the edges of the sheets being inspected, the data transmitted by lines 58", 60", 61", and 62" must be combined in the load circuit with data originating from an apparatus for the determination of the coordinates in the longitudinal direction. Such an apparatus may be similar to that disclosed in FIG. 1.

Figure 5:
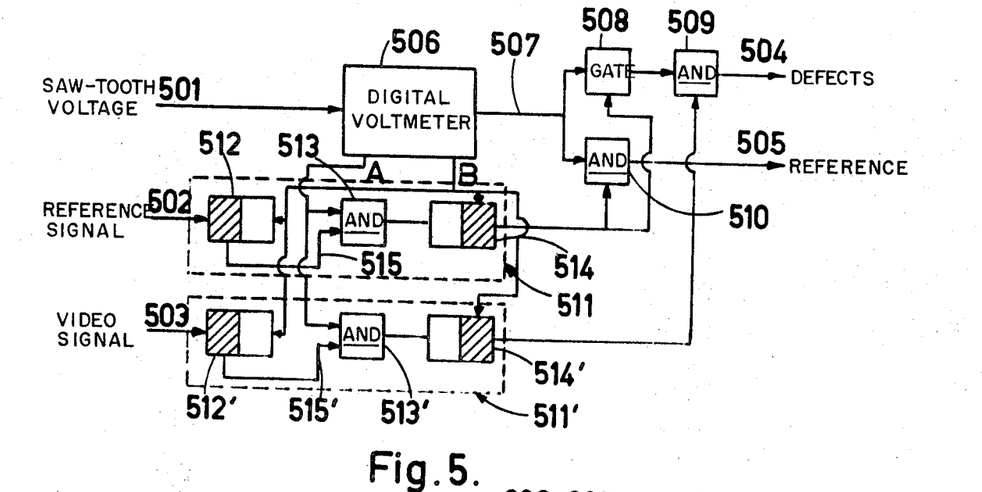
FIGS. 5–7 are block diagrams indicating schematically electrical measuring circuits employed with the apparatus as illustrated in FIGS. 3 and 4.
Figure 6:
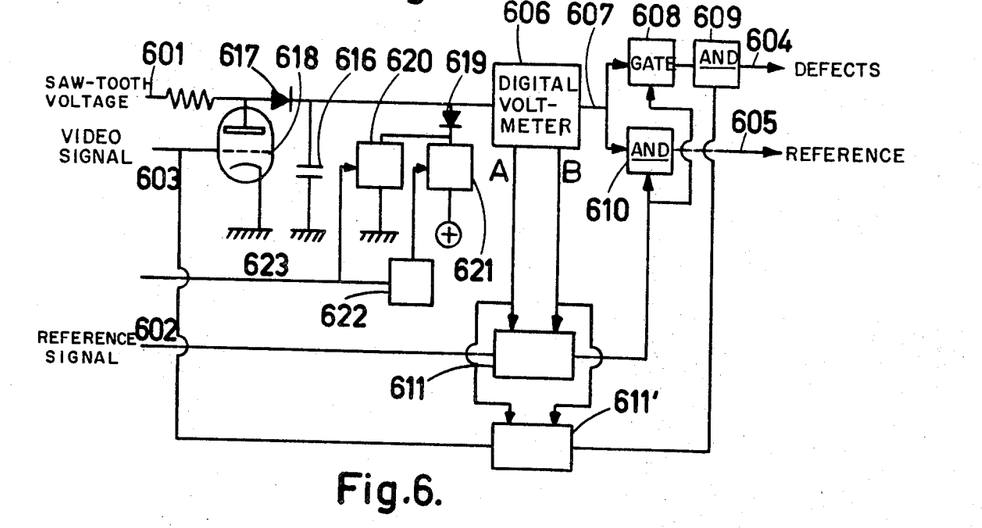
Figure 7:
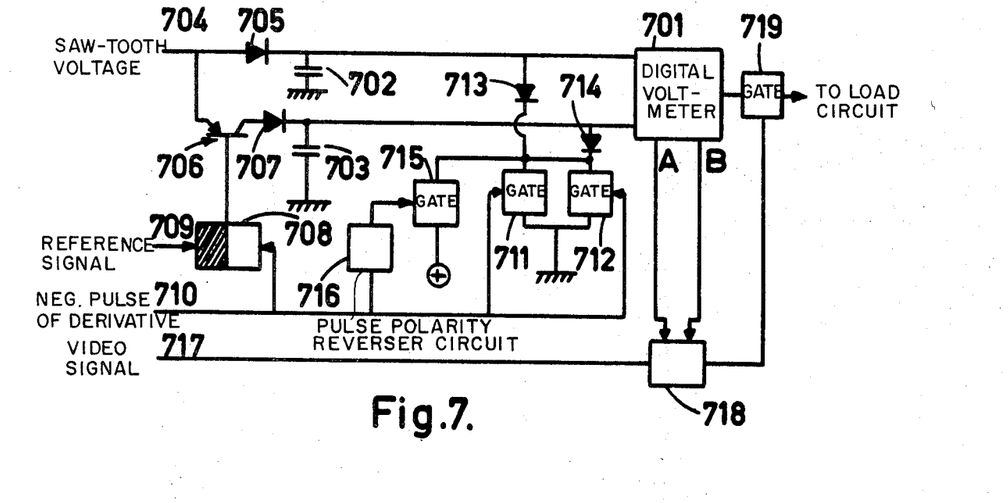

Measuring circuits 43 and 43' as disclosed in FIGS. 3 and 4 may take one of the embodiments illustrated in FIGS. 5, 6, and 7. These embodiments, after slight modification, which will be later described, may also be suitable for the measuring circuit 43" of FIG. 4.

The measuring circuit of FIG. 5 comprises three inputs 501, 502, and 503 on which are applied respectively the sawtooth voltage of the scanning generator, the reference signal and the video signal. The circuit is provided with two output lines 504 and 505 for transmitting respectively data relating to defects and to the reference.

The sawtooth voltage on line 501 is supplied continuously to a rapid digital voltmeter 506 of a known type and delivers the digits in series on output 507. When the number of defects appearing in the sheet material is fairly low it is then possible to use slower acting digital voltmeters. However, for application to data processing machines rapid action digital voltmeters or ammeters are preferred.

Output 507 is connected to line 504 through a gate circuit 508 and an AND circuit 509 and on the other hand to the line 505 through an AND circuit 510. The gate circuit 508 and the AND circuit 510 are both controlled by a reference signal across a synchronizing circuit 511. AND circuit 509 is controlled by the video signal also supplied through a synchronizing circuit 511'.

Since the synchronizing circuits 511 and 511' are identical it will be sufficient to describe only circuit 511 relating to the reference signal. The input of the synchronizing circuit consists of a bistable flip-flop 512 which is normally in the state (0.1). The left signal of this flip-flop is transmitted through line 515 to an AND circuit 513 which also receives on line A the synchronization pulse at the start-of-reading of the digital voltmeter 506.

The output of the AND circuit 513 controls a second bistable flip-flop 514 which is normally in the state (1.0). The right signal of this flip-flop is the output of the synchronizing circuit 511. The two flip-flops 512 and 514 return to their rest states through the end-of-reading synchronization pulse from output line B of voltmeter 506.

In the operation of this measuring circuit the sawtooth voltage will be measured continuously by the voltmeter 506 and the measured values will appear on the output 507. However, these values are not transmitted to the lines 504 and 505 because of the AND gates 509 and 510 which are blocked by the respective outputs of the synchronizing circuits 511 and 511'. Flip-flops 514 and 514' are in their (1.0) state.

When a reference pulse appears on line 502, the flip-flop 512 passes into the state (1.0) and this state is transmitted to the AND circuit 513. A start-of-reading pulse at line A will then produce a signal at the output of AND circuit 513. This signal on the right of the flip-flop will be supplied to the gate 508 to block it. The same signal is transmitted to the AND circuit 510 so that data from line 507 can be transmitted to line 505 and only to this line since line 504 is blocked by the gate 508.

Gate 508 is necessary since the appearance of a reference signal on line 502 implies the appearance of a video signal on line 503. This video signal at 503 will produce the appearance of a signal on the output of the synchronizing circuit 511' and this signal will open the AND gate 509 in line 504.

When an end-of-reading pulse appears on output line B of the voltmeter 506, the flip-flops 512, 512', 514, and 514' will return to their original states. As a result, AND circuits 508 and 510 are blocked and the gate circuit 508" is open.

When a defect video signal arrives on line 503, the operation of synchronizing circuit 511' will actuate the AND gate 509 and the data on line 507 will be transmitted to the output line 504 of the measuring circuit.

The synchronizing circuits 511 and 511' as described above may be used as the synchronizing elements necessary for switches 66, 67, 68 and the AND circuits 63, 64, 65 of FIG. 3 as pointed out above.

In FIG. 6 there is illustrated a measuring circuit using a digital voltmeter with a slower time of response. As mentioned above, a slower acting voltmeter may be used when the number of defects appearing in the material is relatively small. The elements in FIG. 6 which are identical with those of FIG. 5 are designated with reference numerals with the same digits for tens and for units as used for the corresponding elements of FIG. 5. The operation of these circuits is similar. The essential difference between the measuring circuits of FIGS. 5 and 6 is that the sawtooth voltage is no longer applied directly to the voltmeter 606 but to the terminals of a capacitor 616 through a diode 617. Voltmeter 606 is connected to the terminals of the capacitor 616. A triode 618 permits connection of line 601 to ground. The grid of triode 618 receives the video signal of line 603.

In the operation of the measuring circuit of FIG. 6, capacitor 616 is charged by the sawtooth voltage. When scanning of the reference or a defect produces a video pulse on line 603, the pulse is transmitted on the one hand to the synchronizing circuits 611' to unblock the AND circuit 609 and on the other hand to the grid of the triode 618. The triode is rendered conductive and interrupts the charging of capacitor 616 at the instant that the pulse appears. Voltmeter 606 is thus provided with sufficient time to read this voltage and to convert the voltage into digital information. As soon as the video signal disappears, triode 618 is blocked and the charging of the capacitor 616 continues.

When the sawtooth voltage on line 601 drops to its initial value at the end of a scan, capacitor 616 must be discharged. This is accomplished by a diode 619 connected to ground across a gate circuit 620 which is controlled by the negative pulse of the derivative of the sawtooth voltage which appears on line 623. Line 623 is connected to the derivative circuit through the negative pulse selecting circuit and is indicated in dashed lines in FIG. 3 between the output of the pulse selecting circuit 50 and measuring circuit 43.

In order to avoid a discharge of the capacitor through the diode 619 after discharge, a voltage of reverse polarity is applied to the diode. This voltage is controlled by a gate circuit 621 to which is also applied the negative pulse of line 623 but only after passing through a pulse polarity reverser 622.

The two measuring circuits of FIGS. 5 and 6 transmit only information relating to the reference and to the defects. In order to determine the coordinates and hence the location of a defect, the load circuit must also carry out a subtraction operation. Such a measuring circuit is described in FIG. 7 which at its output supplies a value which is directly indicative of the real coordinate since the subtraction operation has already been carried out.

The measuring circuit of FIG. 7 comprises a digital voltmeter 701 with one of its input terminals connected to a plate of a capacitor 702. The other plate of the capacitor is grounded. In a similar manner, the other input terminal of voltmeter 701 is connected to a second capacitor 703. The two capacitors are charged across diodes 705 and 707 from the sawtooth voltage supplied in line 704. A switching transistor 706 permits interruption of the charging of capacitor 703. Transistor 706 is controlled by a bistable flip-flop 708 the operation of which is controlled on one hand by the reference signal entering through line 709 and on the other hand by the negative pulse of the derivative of the sawtooth voltage entering on line 710. This negative pulse in line 710 also controls gate circuits 711 and 712 which control the discharge of the capacitors across diodes 713 and 714. Further, the negative pulse controls gate circuit 715 across a pulse polarity reverser circuit 716 in order to supply a reversed polarity voltage to the diodes 713 and 714 other than during the discharge period.

Video signals arrive on line 717 and are supplied to a synchronizing circuit 718 which is analogous to the synchronizing circuits described in FIG. 5. The output of synchronizing circuit 718 controls gate circuit 719 which is connected to the output of voltmeter 701.

At the start of operation, the state of flip-flop 708 is such that transistor 706 is conductive. During the increase of the sawtooth voltage during a scan the two capacitors 702 and 703 become charged with identical potentials. The value indicated by the voltmeter will therefore be zero.

Upon scanning the reference, a video pulse will appear on line 717 which through the synchronizing circuit 718 will unblock gate circuit 719. This enables the value indicated by the voltmeter to be transferred to the load, which, as described above, may be a data processing machine. Since the indicated value is zero the transfer operation may be controlled. When this transfer is to be stopped, a supplementary gate circuit may be provided on the output of the voltmeter with this gate circuit being blocked by the reference signal in a manner similar to that described in FIGS. 5 and 6.

Since the video pulse results from the reference it will appear at the same time as a reference signal arrives at line 709. This reference signal moves flip-flop 708 into the state which blocks transistor 706 to interrupt the charging of capacitor 703. From this moment only capacitor 702 is still charged by the sawtooth voltage and as a result voltmeter 701 will measure the difference of the voltage between capacitors 702 and 703. When the canning beam impinges upon a defect, a pulse will arrive in line 717 and will unblock gate circuit 719 which is synchronized with the reading of the voltmeter so that the value indicated by the voltmeter at the instant of the appearance of the defect pulse will be transferred to the load circuit.

When the sawtooth voltage returns to its initial value at the end of a scan, a negative pulse will be transmitted to line 710. This pulse will actuate the polarity reverser 716 to block gate circuit 715 which will suppress the reverse polarity voltage on diodes 713 and 714 and, on the other hand, to unblock gates 711 and 712 to discharge capacitors 702 and 703. This same negative pulse on line 710 will return flip-flop 708 into its initial state to again render switching transistor 706 conductive.

Figure 8:
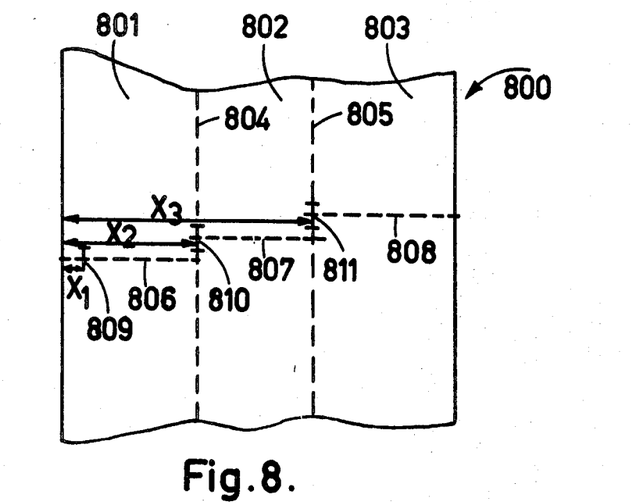
FIG. 8 is a top plan view of a portion of a sheet material illustrating how several structures according to the present invention may be used for sheet material of relatively great width.

Proceeding next to FIG. 8 there is indicated schematicaly how several devices in accordance with the present invention may be used simultaneously for scanning the entire surface of sheet material where the width of the sheet is considerably greater than the width that may be inspected with a single apparatus. The strip of sheet material is indicated at 800 and is divided into three longitudinal bands 801, 802, and 803 separated from each other at 804 and 805. Each of these longitudinal bands is scanned by an apparatus according to the present invention such as an apparatus utilizing a luminous beam. The scans of the longitudinal bands are made along the lines 806, 807 and 808 with reference rods 809, 810, and 811 being provided for each of these scans respectively. The reference rods are positioned as distances $x_1$ $x_2$ and $x_3$ from the edge of strip 800. The rod 809 functions as the general reference for the determination of the transverse coordinates of the defects.

In order to obtain the absolute coordinates of a defect, the information determined from the apparatus performing scan 806 must be decreased by the amount $x_1$, the information pertaining to scan 807 must be increased by the amount $x_2$ and decreased by $x_1$, and the information pertaining to scan 808 increased by $x_3$ and decreased by $x_1$. All of these arithmetic operations are readily performed by the data processing machine of the load circuit as described above.

Under certain circumstances it may be desired that the scanning device be positioned in relatively close proximity to the sheet material being inspected. This may occur where the strip or sheets have a relatively great width or where it is desired to reduce the space occupied by the apparatus. Where it is desired to use an electronic exposure tube apparatus for the scanning, the tube may be displaced transversely to the direction of movement of the sheets or the strip so as to reduce to a minimum the number of exposure tubes required. Such an arrangement is illustrated in FIG. 9.

Figure 9:
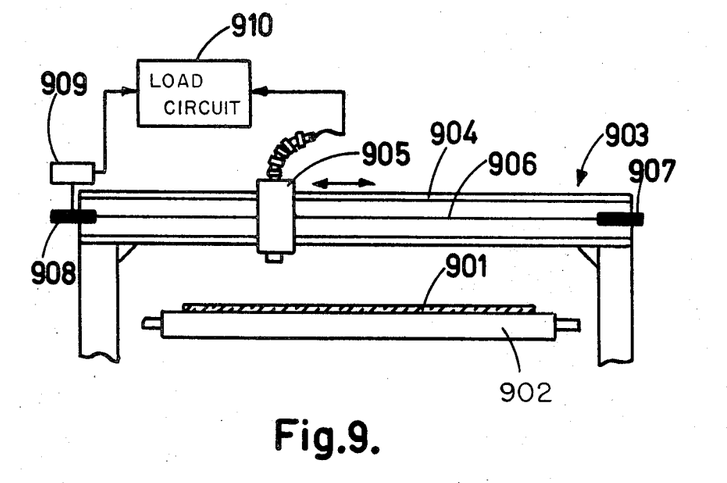
FIG. 9 is a transverse view of a schematic representation of an apparatus according to the present invention for determining the coordinates of defects in sheet material having a relatively great width.

In FIG. 9 the strip or sheet material 901 is moved at a right angle to the plane of the drawing over conveyor rollers 902 and underneath a frame 903. The frame comprises a horizontal beam upon which there is movably mounted an electronic exposure scanning tube 905 which may be of the single line scanning type or of the raster scanning type. The speed of displacement of the tube will be a function of the speed of movement of strip 901.

The tube 905 is attached to an endless wire 906 carried by pulleys 907 and 908. The pulley 907 is driven by a motor, not shown in the drawings, in such a way that the exposure tube 905 is subjected to a reciprocating movement scanning the entire width of strip 901. The signals generated by the exposure tube are transmitted to a load circuit 910. Information relating to the position of the tube with respect to the strip at the instant a defect is detected must be also transmitted to the load circuit in order to enable the load circuit to determine the actual transverse coordinates of the defects. This is accomplished by a position detector 909 carried by the pulley 908 and which may comprise, for example, a pulse generator of the phonic wheel type whose output voltage is transmitted to the load circuit 910. Thus, the movement of the mobile scanning beam generator 905 will control a position detector.

Thus it can be seen that the present invention discloses an apparatus and process for quickly and accurately determining the location of defects in sheet material which may be either in continuous strip form or in the form of individual sheets. The locations of defects are in terms of rectangular coordinates which are determined as the sheet material is moved past a scanning station. The nature of the scanning beam may depend on the kind of material being tested. Where the material is light transmitting or light reflecting a visible light beam may be used with the impinging of the beam on a defect causing a variation in the intensity of the transmitted or reflected light. An automatic defect detection system may respond o such intensity variations. An electronic beam may be used for scanning successive transverse bands of the sheet material. A latent electrostatic or conductivity image may be established on a photo-conductive sheet or layer and the position of a defect may be determined by scanning his image with an electron beam.

The present invention has the advantage that the determination of the coordinates of a defect depends upon the passage of the scanning beam over a defect and is independent of the drift of the voltage or other electrical factor with respect to time since the magnitude of the electrical factor indicates the position of the defect as encountered by the scanning beam with respect to a reference.

Where the sheet material is moving past a scanning station at a relatively low speed successive bands of the material may be scanned by a luminous beam so that variations of intensity of this beam will indicate a defect. When the speed of movement is relatively high such as 7 meters per second or more it may be preferable to scan successive bands of an image of the material, formed on a photosensitive element, by an electronic beam. This scanning may be done in a single dimension such as line scanning or it may be done in two dimensions as in a raster.

In certain inspection procedures it may be that only certain types of defects will be of interest. This may occur when the specifications to which the sheet material products are being manufactured permit certain defects to be excluded and other defects which do not exceed a predetermined degree may be acceptable. Thus the determination of the voltage or current level may be initiated only when the defect signal exceeds or falls below a predetermined level. Also, the determination of the coordinates of the defect may be initiated only when the derivative of the defect signal exceeds or falls below a predetermined level. On other circumstances it may be desired to determine the defect coordinates only when the duration of the defect signal exceeds a specified time duration. Any of these discriminations may be used individually or in combination with each other.

The detector structure may be connected to a derivative circuit which through a threshold circuit blocks any output to the measuring circuit pertaining to defects whenever the derivative of the defect pulses does not reach a predetermined level. This arrangement enables actual defects to be distinguished from mere variations of luminousity of the scanned surface.

It will be understood that this invention is subject to modification in order to adapt it to different uses and conditions and, accordingly, it is desired to comprehend such modification within this invention as may fall within the scope of the appended claims.

What is claimed is:

1. In a process for determining at least one of the coordinates of a defect in sheet material, the steps of generating a scanning beam, scanning successive bands of sheet material, or images of such bands with the beam, controlling the displacing of the beam along each band by at least one electrical factor the magnitude of which varies in monotone fashion, and using the magnitude of said factor at the instant when the beam encounters a defect as a measure of the coordinate of such defect.

2. In a process as claimed in claim 1 with the step of moving the sheet material during the scanning.

3. In a process as claimed in claim 2 with the scanning being along bands perpendicular to the direction of movement of the sheet material.

4. In a process as claimed in claim 1 with the sheet material being a continuous strip.

5. In a process as claimed in claim 1 with the electrical factor being current.

6. In a process as claimed in claim 1 with the electrical factor being current.

7. In a process as claimed in claim 1 with the sign of the change in magnitude of the electrical factor being the same for successive scannings.

8. In a process as claimed in claim 1 with the step of returning the beam to a predetermined starting point after scanning of each band, the magnitude of the electrical factor at this starting point being the same.

9. In a process as claimed in claim 1 with the beam being luminous, and detecting variations in the intensity of the beam transmitted or reflected by the sheet material responsive to a defect.

10. In a process as claimed in claim 1 with the steps of forming an image of the sheet material on a photosensitive element, scanning the successive bands of the image with an electronic beam, and detecting a variation in current responsive to an image of a defect scanned by the beam.

11. In a process as claimed in claim 1 with the step of controlling displacing of the scanning beam by a sawtooth voltage.

12. In a process as claimed in claim 11 with the voltage varying as the function (A, arc tan B$t$) where A and B are constants and $t$ is a variable time.

13. In a process as claimed in claim 1 with the steps of generating a signal in response to the beam passing over a defect, and determining the value of the magnitude in response to the generated signal.

14. In a process as claimed in claim 13 with the value of the magnitude being determined only when the signal exceeds a predetermined level.

15. In a process as claimed in claim 13 with the value of the magnitude being determined only when the derivative of the signal exceeds a predetermined level.

16. In a process as claimed in claim 13 with the value of the magnitude being determined only when the duration of the signal exceeds a predetermined minimum.

17. In a process as claimed in claim 1 with the steps of displacing the beam over a reference during each scanning of a band, generating a signal in response to the passing of the beam over the reference, and determining the value of the magnitude in response to the reference signal.

18. In a process as claimed in claim 1 with the steps of measuring continuously the magnitude of the electrical factor, generating a signal in response to the detection of a defect by the beam, and measuring the value of the electrical factor in response to the detection signal.

19. In a process as claimed in claim 1 with the steps of returning the beam to a predetermined starting point after scanning of each band, the measure of the electrical factor being inhibited during the return movement.

20. In an apparatus for determining at least one of the coordinates of a defect in sheet material, the combination of a scanning beam generator, means for generating one of a control electrical voltage and current which varies periodically and in the same direction during each period, means connected to said electrical generating means for displacing the beam in response to the control electrical factor, means responsive to the beam detecting one of a defect and a reference for delivering a signal, and measuring circuit means connected to said generating means for delivering a signal in response to said detection signal and indicative of the value of the electrical factor at the time of a detection signal.

21. In an apparatus as claimed in claim 20 and means for transporting sheet material past said scanning beam generator.

22. In an apparatus as claimed in claim 20 with said generating means comprising one of a sawtooth voltage and current generator.

23. In an apparatus as claimed in claim 20 with said scanning beam generator comprising a source of a luminous beam, a mirror galvanometer receiving said luminous beam and reflecting the beam onto the sheet material, and photo-sensitive means receiving light reflected or transmitted from said material for detecting variations of light intensity when said beam impinges upon one of a defect and a reference.

24. In an apparatus as claimed in claim 20 with said scanning beam generator comprising an electron gun emitting an electronic beam, a photo-sensitive surface receiving the electron beam, means for forming on said photo-sensitive surface an image of the material being scanned, detector means including an electrode connected to said photo-sensitive surface for delivering a signal in response to said beam impinging on one of a defect and a reference.

25. In an apparatus as claimed in claim 20 and comprising threshold circuit means connected to said detection signal means for blocking the output of said measuring circuit means until the detection signal exceeds a predetermined level.

26. In an apparatus as claimed in claim 25 and comprising derivative circuit means connected to said threshold circuit means for blocking the output of said measuring circuit means until the derivative of the detection signal exceeds a predetermined level.

27. In an apparatus as claimed in claim 20 and comprising a threshold circuit and a derivative circuit having outputs connected to said detection signal means, an OR gate connected to said threshold and derivative outputs, a delay circuit connected to said derivative circuit output, and an AND circuit connected to the output of said OR circuit and having an output connected to said measuring circuit means to block the output of said measuring circuit means until the defect signal therefrom exceeds a predetermined length.

28. In an apparatus as claimed in claim 27 with said delay circuit comprising a monostable multivibrator.

29. In an apparatus as claimed in claim 27 and comprising an inhibiting circuit connected between said derivative and delay circuits to block the input of the delay circuit upon triggering of the delay circuit to prevent triggering of the delay circuit by another defect signal from a defect already detected.

30. In an apparatus as claimed in claim 29 with said inhibiting circuit comprising a delay line and an AND circuit gate.

31. In an apparatus as claimed in claim 20 and comprising a gate circuit connected between said detect signal means and said measuring circuit means.

32. In an apparatus as claimed in claim 31 and comprising a derivative circuit and a pulse polarity selection circuit connected between said gate circuit and the output of said generating means.

33. In an apparatus as claimed in claim 20 with said measuring circuit means comprising one of a voltmeter and an ammeter having an input connected to the output of said generating means.

34. In an apparatus as claimed in claim 20 with said generating means comprising one of a voltage and current generator, said measuring circuit means comprising a voltmeter, a capacitor connected to the input of said voltmeter and being charged by the output of said generator, and a gate circuit connected to said capacitor to interrupt momentarily the charging of said capacitor during a pulse from said detector means in response to one of a defect and a reference.

35. In an apparatus as claimed in claim 33 and comprising a defect reading channel and a reference reading channel connected to the output of one of said voltmeter and said ammeter, a first gate connected in said reference channel, second and third gates connected in said defect channel, means connected to said first and third gates for unblocking said gates in response to defect and reference pulses, said means including means connected to said second gate for blocking said second gate in response to reference pulses.

36. In an apparatus as claimed in claim 20 with said generating means comprising one of a voltage and current generator, said measuring circuit means comprising a voltmeter having two terminals, first and second capacitors connected to the respective terminals and to the output of said generator to be charged in parallel thereby, a gate circuit connected to said second capacitor, a bistable flop-flop connected between said detector signal means and said gate circuit and responsive to a reference pulse, a derivative circuit connected to the output of said generator and a pulse polarity selection circuit connected to said derivative circuit, said bistable flop-flop also being connected to said pulse polarity selection circuit so that the charge of said second capacitor is interrupted by said gate circuit and the flop-flop reclosed by the output of said pulse polarity selection circuit.

37. In an apparatus as claimed in claim 36 and comprising a gate connected to the other of said voltmeter and to said detector means, said gate being unblocked by defect pulses from said detector means.

38. In an apparatus as claimed in claim 35 with there being one of a digital voltmeter and ammeter connected to the output of said generator, said blocking and unblocking means comprising a first bistable flip-flop and connected to said meter to receive an end-of-reading synchronization pulse therefrom, an AND circuit connected to the output of said first bistable flop-flop and to receive a synchronization pulse from said meter, and a second flip-flop connected to the output of said AND circuit and to receive an end-of-reading synchronization pulse from said meter.

39. In an apparatus as claimed in claim 34 and comprising a diode connected to said capacitor to receive the discharge thereacross, a derivative circuit connected to the output of said generator and a pulse polarity selection circuit connected to said derivative circuit, and a second gate circuit connected to said diode and to said pulse polarity selection circuit to assure the discharge of said capacitor.

40. In an apparatus as claimed in claim 39 and comprising a third gate circuit connected between said diode and said pulse polarity selection circuit to polarize the diode in the blocking direction outsde the discharge period of the capacitor.

41. In an apparatus as claimed in claim 20 and comprising a bistable flip-flop having its input connected to said detector means, an AND circuit connected to said detector means and to the output of said flip-flop, a derivative circuit connected to the output of said generator and a pulse polarity selection circuit connected to said derivative circuit, said flip-flop having another input connected to said pulse polarity selection circuit.

42. In an apparatus as claimed in claim 21 with said displacing means displacing said scanning beam generator in a direction transverse to the direction in which the sheet material is being transported, and a position detector being controlled in response to the displacement of said scanning beam generator.

43. In an apparatus as claimed in claim 22 and comprising a generator having the function (A. arc tan B. $t$) where A and B are constants and $t$ is a variable time, said generator being connected to said sawtooth generator and having its output connected to said scanning beam generator.

References Cited

UNITED STATES PATENTS

| 2,866,376 | 12/1958 | Cook | 250—219 |
| 3,432,670 | 3/1969 | Dym | 250—211 |

ARCHIE R. BORCHELT, Primary Examiner

M. ABRAMSON, Assistant Examiner

U.S. Cl. X.R.

356—200, 203